United States Patent
Skoff et al.

(10) Patent No.: US 6,575,269 B1
(45) Date of Patent: Jun. 10, 2003

(54) DEVICE WITH COMPONENTS CONCENTRICALLY DISPOSED AND ROTATIONAL IN RELATION TO EACH OTHER AND UTILIZATION OF SAID DEVICE IN TIRE INFLATING INSTALLATION

(75) Inventors: Gerhard Skoff, Vienna (AT); Heinz Christely, Neubau (AT)

(73) Assignee: Steyr-Daimler-Puch Spezialfahrzeug AG & Co. KG, Vienna (AT)

( * ) Notice: Subject to any disclaimer, the term of this patent is extended or adjusted under 35 U.S.C. 154(b) by 0 days.

(21) Appl. No.: 09/889,123

(22) PCT Filed: Jan. 13, 2000

(86) PCT No.: PCT/AT00/00005

§ 371 (c)(1),
(2), (4) Date: Jul. 11, 2001

(87) PCT Pub. No.: WO00/42337

PCT Pub. Date: Jul. 20, 2000

(30) Foreign Application Priority Data

Jan. 13, 1999 (AT) .......................................... GM21/99

(51) Int. Cl.[7] .................................................. F16C 1/24

(52) U.S. Cl. ......................................... 184/5.1; 152/416
(58) Field of Search .............................. 184/5.1, 105.3; 152/415–418

(56) References Cited

U.S. PATENT DOCUMENTS

| | | | | |
|---|---|---|---|---|
| 4,113,061 A | * | 9/1978 | Peaster | 184/5.1 |
| 4,892,128 A | * | 1/1990 | Bartos | 152/417 |
| 5,080,198 A | * | 1/1992 | Rice | 184/105.3 |
| 5,174,839 A | * | 12/1992 | Schultz et al. | 152/415 |
| 5,303,800 A | * | 4/1994 | Persson | 184/5.1 |
| 5,587,698 A | * | 12/1996 | Genna | 152/417 |
| 6,145,558 A | * | 11/2000 | Schmitz | 152/416 |

* cited by examiner

Primary Examiner—Chong H. Kim
(74) Attorney, Agent, or Firm—Herbert Dubno

(57) ABSTRACT

A tire inflating device for a motor vehicle has a lubricant reservoir connected with a sealed area of the tire bearing. The device has a rotational insert disposed in an external component which has the seal acting upon an inner component. There is a connection member on the wheel support for inflating and deflating a tire mounted on the wheel, a control valve on the hub and bores formed in the wheel support for connecting the connection member with a control valve for the inflation and deflation.

4 Claims, 2 Drawing Sheets

DEVICE WITH COMPONENTS CONCENTRICALLY DISPOSED AND ROTATIONAL IN RELATION TO EACH OTHER AND UTILIZATION OF SAID DEVICE IN TIRE INFLATING INSTALLATION

FIELD OF THE INVENTION

The present invention relates to a device with components concentrically disposed and rotational in relation to each other wherein a rotational insert disposed in an external component having at east one seal with a sealed area acting upon an inner component is provided between said components.

BACKGROUND OF THE INVENTION

A sealed area not being lubricated by its surrounding media is a principal problem in numerous sealing devices. This problem influences the life of the seals and requires the sealed areas to be relubricated within the limits of given maintenance intervals. Frequently the seals are embodied such that a small hollow space is available between two sealing lips in which a small amount of grease and, thus a very limited stock of lubricant only can be provided. Primarily, the insufficient lubrication is a particular problem for rotary shift seals because the life span of the seals suffers and/or an expensive relubrication is required in special maintenance intervals. Rotary shaft seals are used, for example, for sealing the hub in the rotational insert provided at the wheel support in tire inflating arrangements provided for the adjustment of the air pressure in tires. Here, the air being under atmospheric pressure is sealed by means of a rotary shaft seal from the air pressured by the tire and, thus, having a higher pressure.

OBJECT OF THE INVENTION

The object of the invention is to provide a solution for the problem mentioned.

SUMMARY OF THE INVENTION

The given object of the invention is to provide a lubricant reservoir connected with the sealed area via bores, channels, or the like in the region of at least one inner component.

By means of the present invention it is ensured that continuous lubrication, continuous feeding of lubricant to the sealing lips or sealed areas can occur by means of a lubricant reservoir which is connected to the respective lubrication area or areas. On the one hand, said feeding is ensured by the working temperature being higher during operation in relation to the ambient temperature, causing the lubricant to liquify, and by the centrifugal forces occurring during operation.

In a particularly easy manner, this lubricant reservoir can be provided in a hollow space formed by two inner components.

In a particularly easy manner, this lubricant reservoir can be provided in a hollow space formed by two inner components.

In a preferred embodiment according to the invention, the lubricant is continuously squeezed from the lubricant reservoir to the sealed areas in order to ensure the permanent supply of lubricant to the sealed areas of the seals.

This can be done by a piston acting upon the lubricant in the lubricant reservoir.

In a particularly simple variant, a piston activation is provided such that said piston is acted upon by a pressure spring; alternatively or additionally the piston can be actuated with compressed air, in particular, in a computer controlled manner. The latter measure allows an additional supply of lubricant to the sealed areas at certain intervals.

The utilization of the device according to the invention is particularly advantageous for a rotational insert containing rotary shaft seals which seal gases from one another, particularly air, pressurized with different pressure. It is particularly important for seals of this type to sufficiently lubricate the sealed areas in order to avoid a time-consuming relubrication and time-consuming maintenance works.

Therefore, the device according to the invention can be used in a particularly advantageous manner as a component of a tire inflating arrangement wherein the wheel support is the exterior component and the hub and the drive shaft are the inner components.

Therefore, the present invention relates to a tire inflating arrangement having such a device as well.

BRIEF DESCRIPTION OF THE DRAWING

Additional characteristics, advantages, and details of the invention are described in detail using the drawing which show the two exemplary embodiments. Here.

SPECIFIC DESCRIPTION

Figure 1:
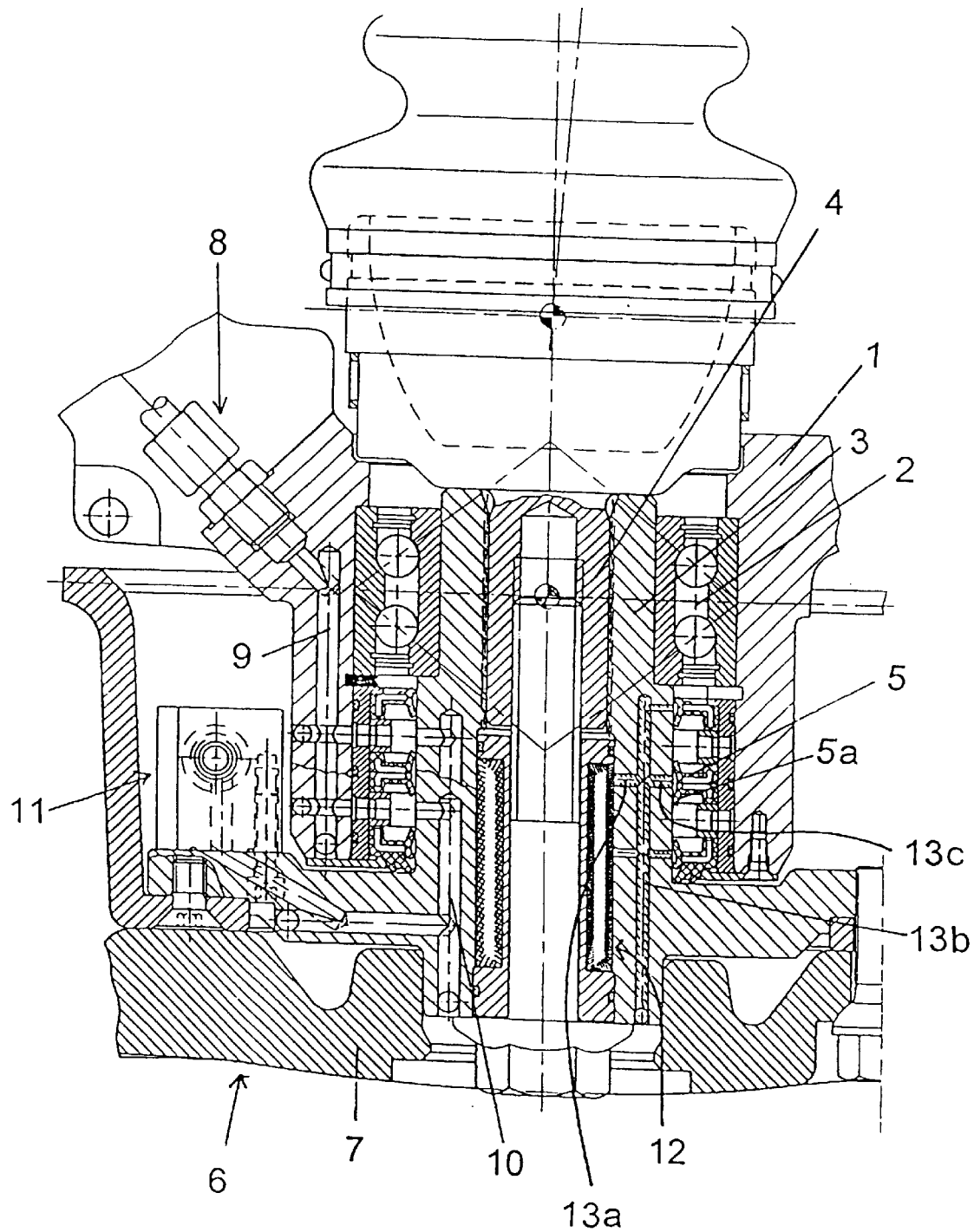
FIGS. 1 and 2 show partial sections along the axis through a wheel unit with one embodiment of the invention each. In the Figures of the drawing only those components are referred to that are necessary for understanding the present invention and said components are described in the following as well.

Here, the wheel support 1, only partially shown in FIG. 1, includes a wheel bearing 2 and a hub 3, rotationally is positioned therein and driven by a drive shaft 4. A number of sealing rings 5 are inserted between the wheel support 1 and the hub 3, forming a rotational insert. A wheel 6 is mounted to the hub 3 in a known fashion and includes a wheel disc 7. Additionally, the wheel 6 includes a tire mounted onto a rim in a known fashion and, thus, not shown.

Figure 2:
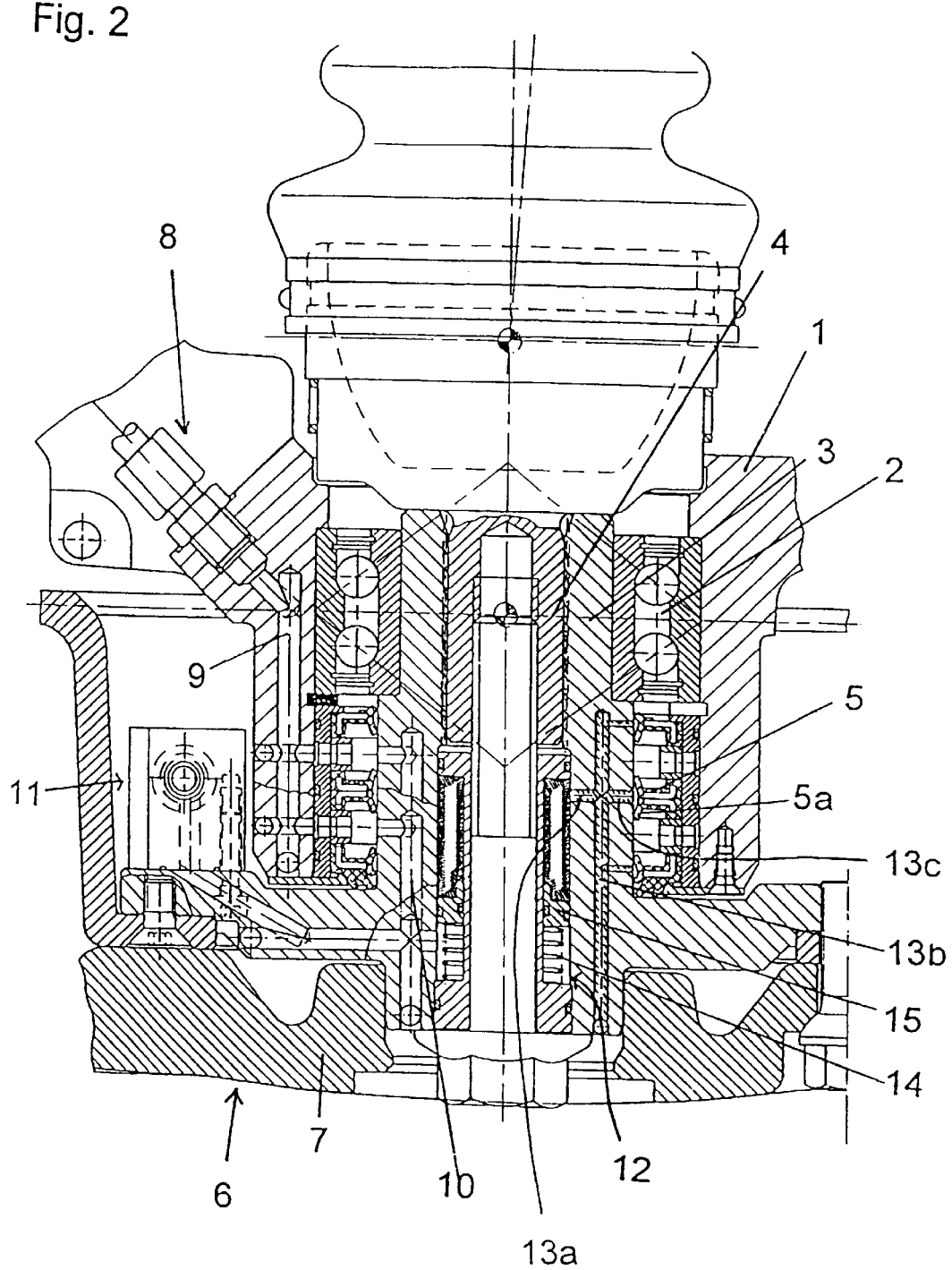

Between the wheel support 1 and the hub 3, in the embodiments shown in FIGS. 1 and 2, three sealing rings 5 are inserted into the rotational insert, designed and arranged in a known fashion, and are in a sealed contact with the exterior region of the hub 3 by means of their two sealing lips 5a.

The inflation and deflation of the tire occurs via a connecting member 8, through channels and/or bores 9 in the wheel support 1 into the chambers of the rotational insert formed between the sealing rings 5, from there, through additional channels and/or bores 10, to a control valve 11 mounted on the hub 3, and from there to the rim by means of additional components not depicted and not essentially necessary for understanding the present invention.

According to the present invention, the drive shaft 4 has a recess at its exterior circumferential region in order to form a revolving hollow space 12, rectangular in its cross-section and elongated, facing the hub 3, which is connected to the rotational insert via bores 13a, 13b 13c having a comparatively small diameter. In the exemplary embodiment shown, two bores 13a are provided extending from the hollow space 12 towards the interior of the hub, mouthing into a connecting bore 13b, wherefrom additional bores 13c are provided opening each into the rotational insert directly in the region between the sealing lips 5a and the seals 5. Here, the connecting bore 13b is provided crosswise to the bores 13a, 13c and ensures that there is a connection between the hollow space 12 and all of the seals 5. As mentioned above, all bores 13c open into such areas in the rotational insert where in the sealed areas of the inserted seals 5 and the small hollow space are provided, each formed between the sealing lips 5a.

The hollow space 12 provided between the drive shaft 4 and the hub 3 is filled with the lubricant and, thus, represents a lubricant reservoir connected via the bores 13a, 13b, and 13c to the above-mentioned lubrication areas, the sealed areas.

Due to the friction of the sealing lips 5a at the hub 5 and due to other secondary heat developing in this area being caused by storage and driving elements as well, a temperature develops during operation in the region of the seals 5 and, thus, the sealing lips 5a as well, which is considerably higher than the ambient temperature prevailing. This softens and/or liquifies the lubricant in the region of the sealed area and, subsequently, in the lubricant reservoir as well. Due to the centrifugal forces occurring during operation, the lubricant is now transported to the sealed areas via the bores 13a, 13b, 13c and lubricates them. At a standstill, it is possible for the lubricant to partially drain off the region of the sealed areas, however, a film of lubricant remains on the sealed area in any case.

Therefore, by using the present invention the seals 5 become maintenance-free in this respect, which can even last for their entire life span.

FIG. 2 shows another embodiment of the present invention. Said embodiment varies only in one particular in the region of the lubricant reservoir so that those components which are consistent with the components shown in FIG. 1, were provided with identical reference numbers and are not described separately.

As shown in FIG. 2, in this variant the space available by the hollow space 12 is used partially as a lubricant reservoir and partially for housing a piston 15 biased by a pressure spring 14. On its one end, the pressure spring 14 is supported at the bottom of the hollow space 12 and on its other end, said spring bears on the movable piston 15, which is sealed by O-sealings rings from the hub 3 as well as the drive shaft 4, with the piston 15 itself pressing on the lubricant provided in the hollow space 12 and, thus, squeezes it into the bores 13a, 13b, and 13c and against the sealed areas of the seals 5. As a result of the spacial conditions, slightly modified here, only a single bore 13a is provided for the connecting bore 13b wherefrom a bore 13c extends to each of the seals 5. Thus, in this variant of the embodiment the lubricant is continuously squeezed and/or fed to the sealed areas by means of the prestress or bias of the spring.

In another embodiment according to the invention, not shown, in order to ensure a good lubricant supply to the sealed areas, the piston 15 can additionally be activated with compressed air which is controlled via a central processor, a computer, at certain maintenance intervals.

If necessary and permitted by the spatial conditions, a supply of lubricants to the sealed areas can be provided in more than one location.

The present invention is not limited to the arrangement sown and described here, but it can be used wherever it is advantageous to lubricate seals of components, rotational in reference to one another, in order to extend their life span.

What is claimed is:

1. A tire-inflating device comprising:

an outer wheel-supporting member;

a wheel bearing in said wheel-supporting member;

a hub within said wheel-supporting member and journaled for rotation relative to said wheel-supporting member by said wheel bearing;

a plurality of axially spaced sealing rings between said hub and said wheel-supporting member, each of said sealing rings having a pair of annular sealing lips defining a lubrication space between them;

an axially elongated lubricant reservoir formed in said hub and connected to said lubrication spaces by at least one channel formed in said hub and extending at least in part in a radial direction;

a wheel mounted on said hub;

a connection member on said wheel-supporting member for inflating and deflating a tire adapted to be mounted on said wheel; and a control valve on said hub; and bores formed in said wheel-supporting member for connecting said connection member with said control valve for inflation and deflation of the tire.

2. The tire-inflating device defined in claims 1, further comprising means for pressing lubricant axially in said reservoir for forcing the lubricant into said lubrication spaces.

3. The tire-inflating device defined in claim 2 wherein said means is an axially displaceable piston bearing upon the lubricant in-said reservoir.

4. The tire-inflating device defined in claim 3, further comprising a spring in said hub braced against said piston.

* * * * *